United States Patent [19]

Colford

[11] Patent Number: 5,735,746
[45] Date of Patent: Apr. 7, 1998

[54] TORSIONAL VIBRATION DAMPER WITH DEFLECTABLE SPOKES

[75] Inventor: Terry Colford, Queniborough, England

[73] Assignee: Firma Carl Freudenberg, Weinheim, Germany

[21] Appl. No.: 641,864

[22] Filed: May 2, 1996

Related U.S. Application Data

[62] Division of Ser. No. 260,438, Jun. 15, 1994, Pat. No. 5,573,461.

[30] Foreign Application Priority Data

Jun. 24, 1993 [DE] Germany .................. 43 20 938.6

[51] Int. Cl.$^6$ ........................... F16D 3/56; F16D 3/64
[52] U.S. Cl. ............................... 464/83; 464/89
[58] Field of Search ............................ 464/89, 90, 91, 464/81, 82, 83, 84, 160; 74/574

[56] References Cited

U.S. PATENT DOCUMENTS

| | | | |
|---|---|---|---|
| 3,245,229 | 4/1966 | Fadler | 464/90 |
| 4,368,050 | 1/1983 | Peterson | 464/83 |
| 4,518,368 | 5/1985 | Peretti | 464/81 X |

FOREIGN PATENT DOCUMENTS 170944  10/1983  Japan ........................ 464/89

*Primary Examiner*—Daniel P. Stodola
*Assistant Examiner*—Emmanuel M. Marcelo
*Attorney, Agent, or Firm*—Kenyon & Kenyon

[57] ABSTRACT

A torsional vibration damper with an outside ring and an inside ring which surround each other and are connected to each other with rotational elasticity by way of spokes which can be deflected in the circumferential direction. The spokes are non-deformable and are connected with the inside ring and with the outside ring by way of intermediate layers made of rubber.

5 Claims, 4 Drawing Sheets

TORSIONAL VIBRATION DAMPER WITH DEFLECTABLE SPOKES

RELATED U.S. PATENT APPLICATIONS

The present application is a division of U.S. patent application Ser. No. 08/260,438, filed on Jun. 15, 1994, now U.S. Pat. No. 5,573,461, by Colford, T., entitled "Torsional Vibration Damper With Deflectable Spokes".

BACKGROUND OF THE INVENTION

1. Field of the Invention

The invention relates to a torsional vibration damper with an outside ring and an inside ring which surround each other and are connected with rotational elasticity by way of spokes which can be deflected in the circumferential direction.

2. Description of the Related Art

A torsional vibration damper is shown in DE-OS 28 10 885. In the device shown in that publication, the spokes, which can be deflected in the circumferential direction, are formed by plate springs which are arranged in a chamber hermetically sealed and filled with liquid, and which are affixed to an outside ring so they cannot rotate. By way of the elastic spokes, it is possible to transfer torque, which is insulated against vibrations, from the inside ring to the outside ring, and a certain amount of liquid damping occurs. However, it is difficult to achieve a permanent seal of the chambers filled with liquid in a device of this design.

SUMMARY OF THE INVENTION

The present invention is intended to provide a torsional vibration damper so that a significantly simplified design and good durability are obtained.

In the torsional vibration damper according to the present invention, the spokes are non-deformable and are connected with the inside ring and the outside ring by intermediate layers made of rubber. The intermediate layers, the inside ring, the outside ring and the spokes are adhesively connected—for example when shaping and hardening the material which forms the intermediate layers—by directly vulcanizing the intermediate layers onto the surfaces which lie adjacent the layers.

Production of the torsional vibration damper of the present invention is simple. In the present invention, it is possible to adapt the value of the torque which can be transferred from the inside ring to the outside ring, as well as the damping effect which is achieved in the transfer of torque, to the special conditions of any particular application by selecting a specific rubber material for the intermediate layers. Torsional vibration dampers in which the inside ring and the outside ring as well as the spokes are structured in an identical manner can thereby be made accessible to different applications in a relatively simple manner.

The spokes in the present invention can be structured essentially in a plate-like form and can be arranged in planes which extend parallel to the axis of rotation. The plates impart good axial guidance to the outside ring relative to the inside ring, due to their non-resilient structure. Therefore, large axial forces can be transferred from the inside ring to the outside ring without problems.

When radial forces are introduced, perpendicular compression of the intermediate layers occurs. The areas have a relatively large expanse in terms of area. Even when relatively soft elastic materials are used to produce the intermediate layers, relatively large radial forces can be transferred, without any significant relative displacement of the outside ring to the inside ring taking place in the radial direction. This result is very advantageous with regard to avoiding out-of-balance phenomena at high rotational speeds. It is therefore advantageous to structure the outside ring as a belt pulley and to use the torsional vibration damper as a drive for belt-driven secondary units in a motor vehicle, which are thereafter unaffected by vibrations.

The specific cross-sectional stress on the intermediate layers is particularly low during relative displacement of the outside ring with reference to the inside ring if the spokes end in convex surfaces on the sides facing towards the inside ring and the outside ring, which surfaces extend parallel to the axis of rotation. In this design, the intermediate layers should be essentially of uniform thickness at all points. This design results in the condition that the inside ring is provided with concave indentations on the side facing the spokes, which indentations extend parallel to the axis of rotation. The production of corresponding indentations is relatively simple if the inside ring is produced by die-casting or other casting methods. The use of polymer materials for production of the ring is also possible in most cases.

The spokes should be structured so that they are non-deformable. If this is the case, the spokes can be modified in many different ways and can have a dumbbell-shaped profile, for example, in a plane which extends perpendicular to the axis of rotation. With the relatively reduced inertial mass of this design, an increased binding surface for fixing the intermediate layers of rubber in place is still available.

The spokes can be provided with a recess and/or perforation open in the axial direction at at least one point between the surfaces which delimit the spokes on the outside and the inside, in order to save weight. If necessary, it is possible to find room for secondary machine parts in the open areas gained in this way, for example components of another torsional vibration damper which is connected with the outside ring or the inside ring.

The spokes can have a barrel-like profile, in a plane perpendicular to the axis of rotation. This design causes the spokes to demonstrate particularly good bearing capacity in the radial direction, while the intermediate rubber layers are limited to very small expanses in the circumferential direction and the radial direction. If necessary, it is possible to give the intermediate layers that are arranged in the area of the outside circumference dimensions that agree with the intermediate layers that are displaced radially towards the inside. This results in relatively easy deflection in the circumferential direction, with excellent support in the radial direction. It is possible to insulate torsional vibrations in an excellent manner in this way.

BRIEF DESCRIPTION OF THE DRAWINGS

The object of the present invention will be explained in greater detail below, on the basis of the drawings, wherein.

DETAILED DESCRIPTION OF THE DRAWINGS

Figure 1:
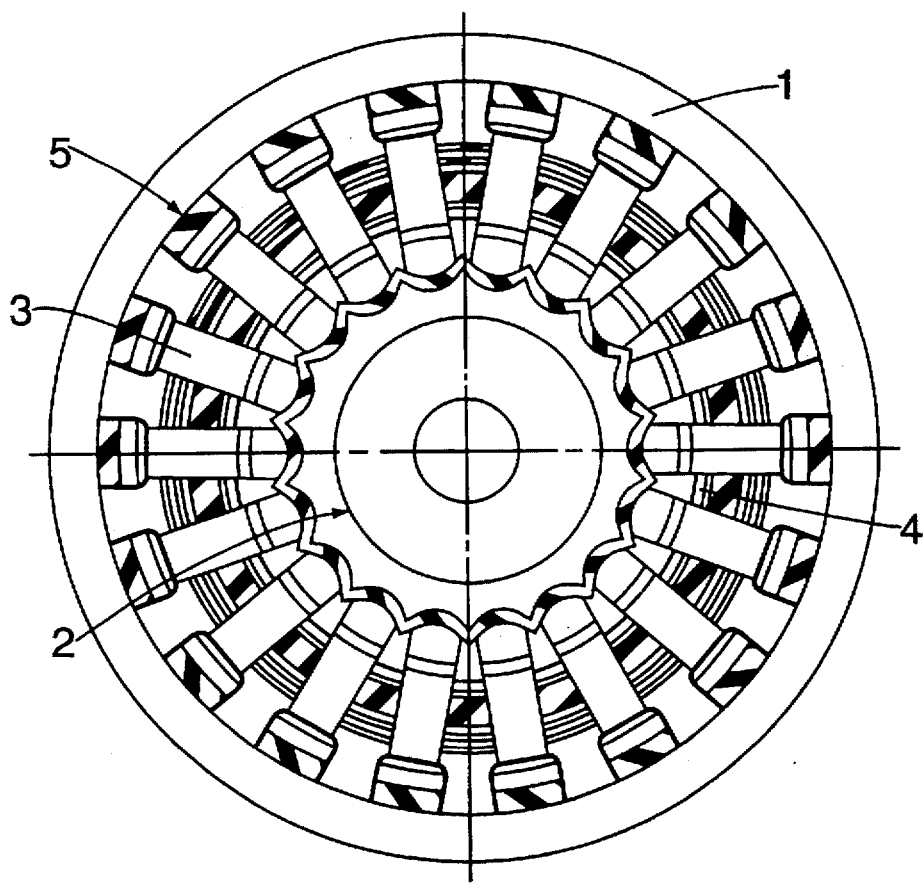
FIG. 1 shows a first embodiment of the torsional vibration damper according to the present invention in a front view.

The torsional vibration damper shown in FIG. 1 consists of an outside ring 1, an inside ring 2, a plurality of non-deformable spokes 3 uniformly distributed in the circumferential direction, as well as intermediate layers 4 made of rubber, which connect the inside ring 2, the spokes 3 and the outside ring 1 to each other. The spokes 3 are radially delimited on the outside and inside by surfaces which extend parallel to the axis of rotation 6 and have a concave profile in a plane perpendicular to the axis of rotation 6. The intermediate layers 4 are of essentially uniform thickness in all their sections. Accordingly, the inside ring 2 is delimited by convex recesses at the points which lie radially opposite the spokes 3.

Figure 2:
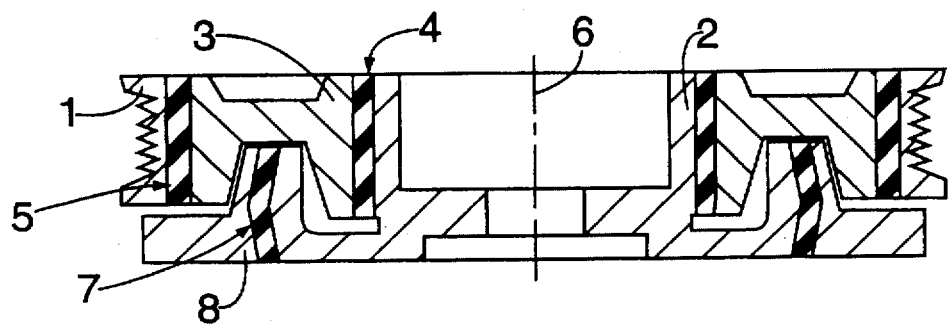
FIG. 2 shows the torsional vibration damper of FIG. 1 in lateral cross-section.

FIG. 2 shows the torsional vibration damper according to FIG. 1 in lateral cross-section. This figure shows that the spokes 3 are provided with recesses open in a C shape in the axial direction, on both sides of the spokes, between the outside and inside delimitation surfaces of the spokes. On one side, these recesses serve to hold a ring projection 8 of a torsional vibration damper, which is connected with the inside ring 2 via an intermediate layer 7 of an elastic material. Torsional vibrations of the inside ring can be damped to a high degree as a result of this configuration. The outside ring 1 is formed as a belt pulley and is used to introduce rotational movement into the torsional vibration damper. Torsional vibrations superimposed on the rotational movements are insulated to a high degree by means of the spokes 3, which can be deflected in the circumferential direction and are non-deformable. The spokes are connected with the inside ring 2 and with the outside ring 1 by way of the intermediate layers 4 made of rubber. The belt forces which are effective radially only in one direction can therefore be absorbed without significant radial displacement of the outside ring 1 with reference to the inside ring 2, which is very advantageous with regard to avoiding out-of-balance phenomena.

Figure 3:
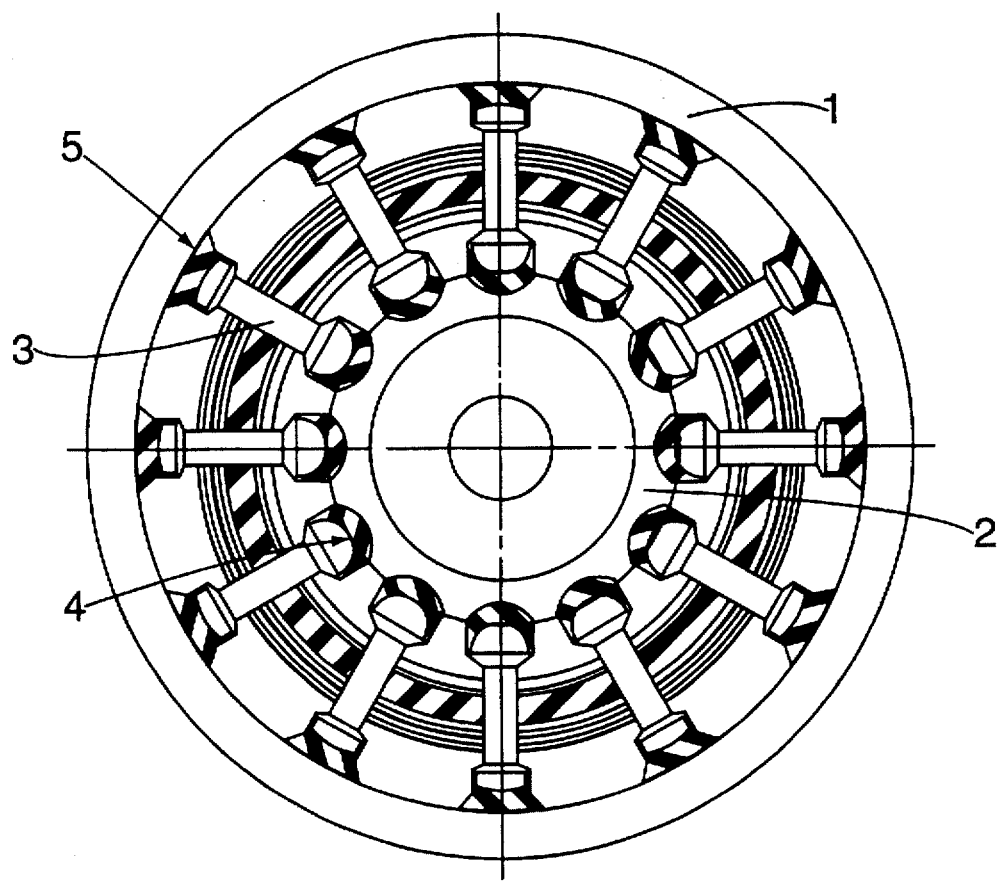
FIG. 3 shows another embodiment of the torsional vibration damper according to the present invention in a front view.

The torsional vibration damper shown in FIG. 3 differs from the embodiment shown in FIG. 1 in that the spokes 3 which can be deflected in the circumferential direction have a dumbbell-shaped profile, seen in a plane perpendicular to the axis of rotation 6. The surfaces 5 which delimit the spokes on the outside and the inside have a convex profile, seen perpendicular to the axis of rotation 6. The surfaces 5 extend parallel to the axis of rotation 6, as is described above. The intermediate layers 4 are of essentially uniform thickness in all their sections. The intermediate layers 4 are preferably made of an elastomeric material, such as rubber.

Because of the dumbbell-shaped formation of the profile of the spokes, a reduction in the inertial mass occurs. The power-to-weight ratio of the torsional vibration damper shown in FIG. 3 is improved as a result of this design.

Figure 4:
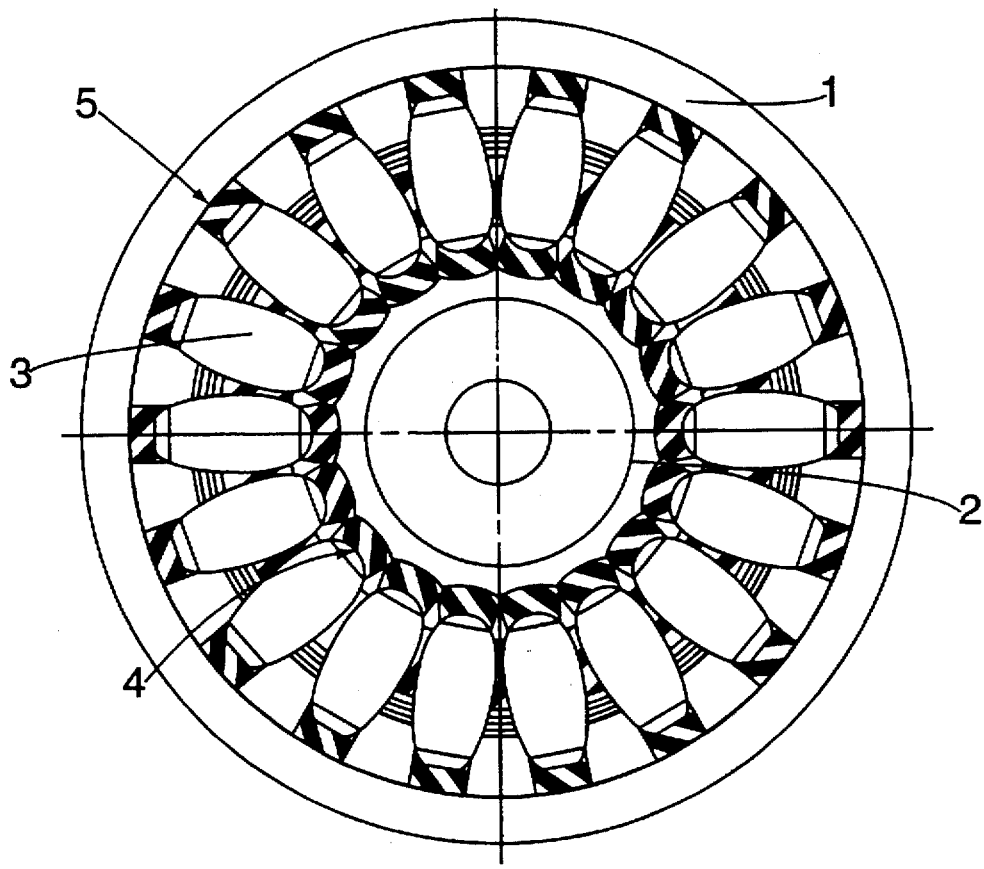
FIG. 4 shows another embodiment of the torsional vibration damper according to the present invention in a front view.
Figure 5:
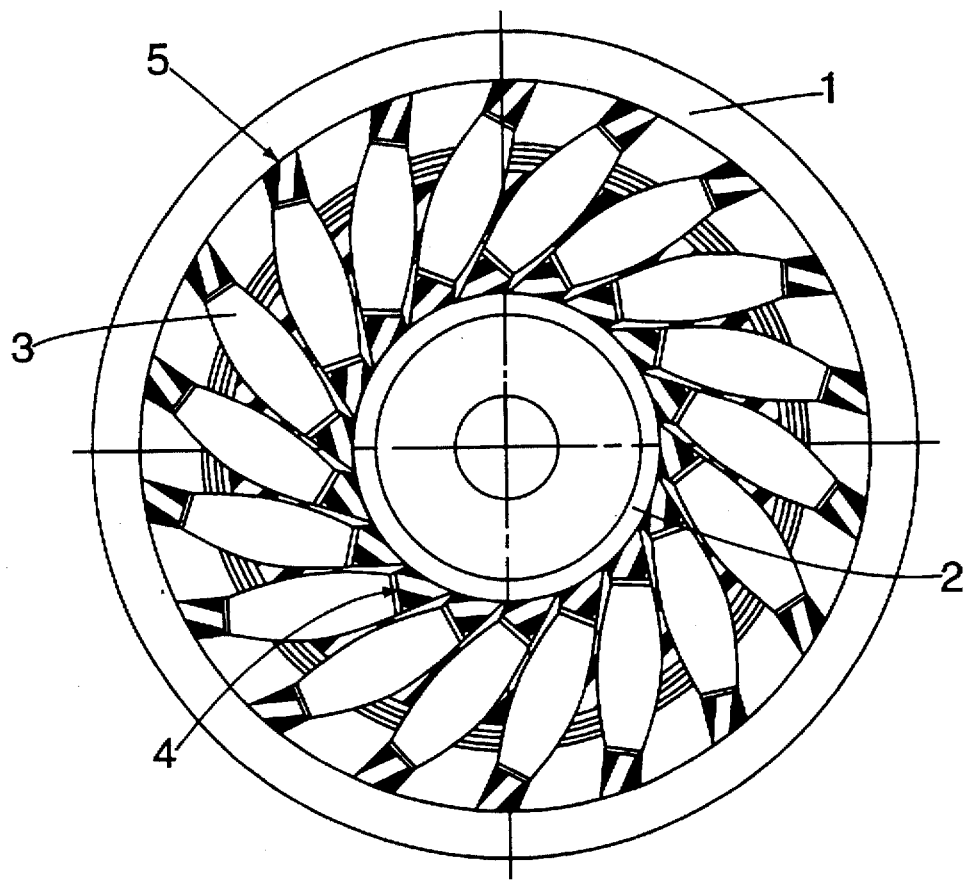
FIG. 5 shows the embodiment of FIG. 4 in a different rotational position.

FIGS. 4 and 5 show a further embodiment of the present invention, in which the spokes 3 have a barrel-like profile in a plane perpendicular to the axis of rotation 6. FIG. 4 shows the rotation part while it is not turning. It can be seen that the spokes 3 are spaced from one another even in the center of the damper, in the circumferential direction. Torsional vibrations between the outside ring 1 and the inside ring 2 can therefore be absorbed without problems and insulated by deformation of the rubber layers 4.

FIG. 5 shows the rotation part according to FIG. 4 during extremely large deflections of the outside ring 1 relative to the inside ring 2. It can be seen that the spokes 3, viewed in the circumferential direction, come into reciprocal contact. The spokes 3 are made of a non-resilient material, which causes relative distortion of the outside ring 1 to the inside ring 2 to be very strongly inhibited. Damage to the intermediate layers 4 consisting of rubber-elastic material resulting from overload can be avoided in this way, to a great extent.

The embodiment shown in FIGS. 4 and 5 is also possible in a form where the spokes 3 have a profile open in C shape axially in at least one direction, along a plane established through the axis of rotation 6. The recess formed in this way can be utilized, analogous to the variant of the rotation part shown in FIG. 2, to hold a ring projection 8 of a secondary machine part which moves jointly with the rotation part. This creates the possibility of sizing the radial distance between the ring projection 8 and the surfaces which delimit the recess in the radial direction in such a way that reciprocal contact between the ring projection 8 and the stated surfaces occurs when the maximum permissible deflection movement of the outside ring 1 with reference to the inside ring 2 has been reached. The structure therefore can have a stop function in certain respects. This is indicated in sections in the bottom part of the representation according to FIG. 5. At least the intermediate layers 4 made of rubber which are located radially on the inside can be protected against mechanical overstretching and destruction in this way.

I claim:

1. A torsional vibration damper for damping vibrations of a rotating body, said torsional vibration damper comprising:

an outside ring;

an inside ring surrounded by said outside ring;

a plurality of spokes connecting said inside and said outside rings, said spokes being connected to the inside ring and to the outside ring by intermediate layers of an elastic material, said intermediate layers allowing circumferential displacement of said outside ring relative to said inside ring, said spokes having recesses open in a C shape in at least one axial direction, said inside ring comprising a ring projection, said ring projection projecting within said recesses.

2. A torsional vibration damper for damping vibrations of a rotating body, said torsional vibration damper comprising:

an outside ring;

an inside ring surrounded by said outside ring;

a plurality of spokes connecting said inside and said outside rings, said inside ring comprising a ring projection projecting axially towards said spokes, said spokes being connected to the inside ring and to the outside ring by intermediate layers of an elastic material, said intermediate layers allowing circumferential displacement of said outside ring relative to said inside ring, said spokes comprising convex surfaces facing towards said inside ring and said outside ring, said convex surfaces extending parallel to an axis of rotation of said damper.

3. The torsional vibration damper of claim 2, wherein:

said inside ring comprises a ring projection, said ring projection comprising an intermediate elastic layer.

4. The torsional vibration damper of claim 2, wherein:

said ring projection acts as a stop against excessive circumferential deflections of said spokes.

5. A torsional vibration damper for damping vibrations of a rotating body, said torsional vibration damper comprising:

an outside ring, said outside ring comprising an inertial mass;

an inside ring surrounded by said outside ring, said inertial mass damping vibrations of said inside ring;

a plurality of spokes connecting said inside and said outside rings, said spokes being connected to the inside ring and to the outside ring by intermediate layers of an elastic material, said intermediate layers allowing circumferential displacement of said outside ring relative to said inside ring to thereby damp vibrations of said inside ring, said spokes comprising convex surfaces facing towards said inside ring and said outside ring, said convex surfaces extending parallel to an axis of rotation of said damper, wherein said spokes have a barrel-shaped profile.

* * * * *